(12) United States Patent
Fujii

(10) Patent No.: US 7,854,975 B2
(45) Date of Patent: Dec. 21, 2010

(54) JOINED BODY AND MANUFACTURING METHOD FOR THE SAME

(75) Inventor: Tomoyuki Fujii, Nagoya (JP)

(73) Assignee: NGK Insulators, Ltd., Nagoya-Shi (JP)

(*) Notice: Subject to any disclaimer, the term of this patent is extended or adjusted under 35 U.S.C. 154(b) by 354 days.

(21) Appl. No.: 11/354,428

(22) Filed: Feb. 15, 2006

(65) Prior Publication Data

US 2006/0182908 A1 Aug. 17, 2006

Related U.S. Application Data

(60) Provisional application No. 60/653,320, filed on Feb. 16, 2005.

(51) Int. Cl.
*A47G 19/22* (2006.01)
*B32B 15/04* (2006.01)
*H05B 3/68* (2006.01)
*H05B 3/10* (2006.01)
*B23K 31/02* (2006.01)
*C22C 21/04* (2006.01)

(52) U.S. Cl. .............. 428/34.4; 428/471; 219/444.1; 219/468.1; 219/553; 228/121; 420/546

(58) Field of Classification Search .............. 428/34.4, 428/471; 219/444.1, 468.1, 553; 228/121; 420/546
See application file for complete search history.

(56) References Cited

U.S. PATENT DOCUMENTS

| 4,552,301 | A | 11/1985 | Liehr et al. |
| 4,784,313 | A | 11/1988 | Godziemba-Maliszewski |
| 4,871,107 | A | 10/1989 | Yamada et al. |
| 5,154,863 | A * | 10/1992 | Miyahara .................... 264/659 |
| 5,234,759 | A * | 8/1993 | Inabayashi et al. .......... 428/330 |
| 5,721,062 | A | 2/1998 | Kobayashi |
| 6,261,708 | B1 | 7/2001 | Ohashi et al. |
| 2001/0040180 | A1* | 11/2001 | Wittebrood et al. ......... 228/219 |
| 2003/0183616 | A1* | 10/2003 | Goto ........................ 219/444.1 |
| 2004/0016792 | A1* | 1/2004 | Fujii et al. ................... 228/194 |
| 2004/0132323 | A1* | 7/2004 | Saka et al. .................... 439/79 |

FOREIGN PATENT DOCUMENTS

| DE | 33 07 701 A1 | 9/1984 |
| EP | 0 726 238 A2 | 8/1996 |
| EP | 0 795 524 A1 | 9/1997 |
| JP | 59-217682 | 12/1984 |
| JP | 08-073280 A1 | 3/1996 |
| JP | 10-273370 A1 | 10/1998 |
| JP | 2001-114575 | 4/2001 |
| JP | 2002110321 A * | 4/2002 |

OTHER PUBLICATIONS

Hawley's Condensed Chemical Dictionary, Fourteenth Edition; 2002; John Wiley & Sons, Inc.*
JIS Japanese Industrial Standards (2002), p. 1-17.*

* cited by examiner

*Primary Examiner*—Rena L Dye
*Assistant Examiner*—James Yager
(74) *Attorney, Agent, or Firm*—Burr & Brown

(57) ABSTRACT

A joined body includes a first ceramic member, a second ceramic member, and a joining layer which contains soft metal, and joins the first ceramic member and the second ceramic member to each other by being thermally compressed at a joining temperature lower than a solidus of the soft metal.

12 Claims, 2 Drawing Sheets

FIG.3

| | First Ceramics | Second Ceramics | Composition of joining material(wt%) | Thickness of joining layer (mm) | 4-Point Bending Strength (MPa) | | Defect | Fracture Position |
| --- | --- | --- | --- | --- | --- | --- | --- | --- |
| | | | | | Joined Body | Base Material | | |
| Example 1 of the present invention | Aluminum nitride | Aluminum nitride | Al-10Si-1.5Mg | 0.12 | 320 | 350 | None | Inside of base material |
| Example 2 of the present invention | Silicon carbide | Silicon carbide | Al-10Si-1.5Mg | 0.12 | 550 | 570 | None | Inside of base material |
| Example 3 of the present invention | Alumina | Alumina | Al-10Si-1.5Mg | 0.12 | 340 | 380 | None | Inside of base material |
| Example 4 of the present invention | Silicon nitride | Silicon nitride | Al-10Si-1.5Mg | 0.12 | 720 | 780 | None | Inside of base material |
| Example 5 of the present invention | Aluminum nitride | Aluminum nitride | Al-10Si-1.5Mg | 0.05 | 300 | 350 | None | Inside of base material |
| Example 6 of the present invention | Aluminum nitride | Aluminum nitride | Al-10Si-1.5Mg | 0.03 | 320 | 350 | None | Inside of base material |
| Example 7 of the present invention | Aluminum nitride | Aluminum nitride | Al-5Mg | 0.1 | 300 | 350 | None | Inside of base material |
| Example 8 of the present invention | Silicon carbide A | Silicon carbide B | Al-10Si-1.5Mg | 0.12 | 550 | 570 | None | Inside of base material |
| Comparative example 1 | Aluminum nitride | Silicon nitride | Al-10Si-1.5Mg | 0.12 | 250 | — | Crack at joining interface | Joining interface |
| Comparative example 2 | Aluminum nitride | Aluminum nitride | 99Al | 0.1 | 150 | 350 | Gap at joining interface | Joining interface |
| Comparative example 3 | Aluminum nitride | Aluminum nitride | Al-10Mg | 0.1 | 120 | 350 | Gap at joining interface | Joining interface |
| Comparative example 4 | Aluminum nitride | Aluminum nitride | Al-10Si-1.5Mg | 0.02 | 80 | 350 | Gap at joining interface | Joining interface |
| Comparative example 5 | Aluminum nitride | Aluminum nitride | Al-10Si-1.5Mg | 0.5 | 150 | 350 | Gap at joining interface | Joining interface | ns
JOINED BODY AND MANUFACTURING METHOD FOR THE SAME

CROSS REFERENCE TO RELATED APPLICATIONS

This application is based upon and claims the benefit of priority from prior U.S. Provisional Application No. 60/653,320, filed on Feb. 16, 2005; the entire contents of which are incorporated herein by reference.

BACKGROUND OF THE INVENTION

1. Field of the Invention

The present invention relates to a joined body in which ceramic members are joined together, and to a manufacturing method for the same.

2. Description of the Related Art

Heretofore, as methods for manufacturing a joined body by joining plural ceramic members together, solid phase joining, liquid phase joining, and the like have been proposed. For example, there has been proposed a method, in which yttrium nitrate is coated on joined surfaces of aluminum nitride members, and the aluminum nitride members are subjected to the solid phase joining at 1800° C. (refer to Japanese Patent Laid-Open Publication No. H8-73280 (published in 1996)). Moreover, there has been proposed liquid phase joining, in which a joining material formed by mixing aluminum nitride particles and a fusion material together is interposed between the aluminum nitride members, the joining material concerned is fused, and the aluminum nitride is thus recrystallized on joined portions of the aluminum nitride members (refer to Japanese Patent Laid-Open No. H10-273370 (published in 1998)).

However, in each of the solid phase joining and the liquid phase joining, a joining temperature is as high as 1500° C. or higher, and accordingly, there has been a possibility that, at the time of the joining, the ceramic members deform, and surfaces of the ceramic members are deteriorated in quality. Therefore, there has been a case where the joined body requires processes after joining.

SUMMARY OF THE INVENTION

It is an object of the present invention to provide a joined body which prevents the deformation and quality deterioration of the ceramic members owing to the joining, and to provide a manufacturing method for the same.

A joined body according to the present invention includes: a first ceramic member; a second ceramic member; and a joining layer which contains soft metal, and joins the first ceramic member and the second ceramic member to each other by being thermally compressed at a joining temperature lower than a liquidus of the soft metal.

A method of manufacturing a joined body according to the present invention includes: interposing a joining material containing soft metal between a first ceramic member and a second ceramic member; and thermally compressing the first ceramic member and the second ceramic member at the joining temperature lower than a liquidus of the soft metal in the joining material, thereby joining the first ceramic member and the second ceramic member to each other through a joining layer.

According to the joined body and the method for manufacturing the same, which are as described above, the joining temperature can be set as low as lower than the liquidus of the soft metal, and accordingly, the deformation and the quality deterioration can be prevented from occurring in the ceramic members owing to the joining.

BRIEF DESCRIPTION OF THE DRAWINGS

FIG. 3 shows results of Example 1.

DETAILED DESCRIPTION OF THE EMBODIMENTS

Figure 1:
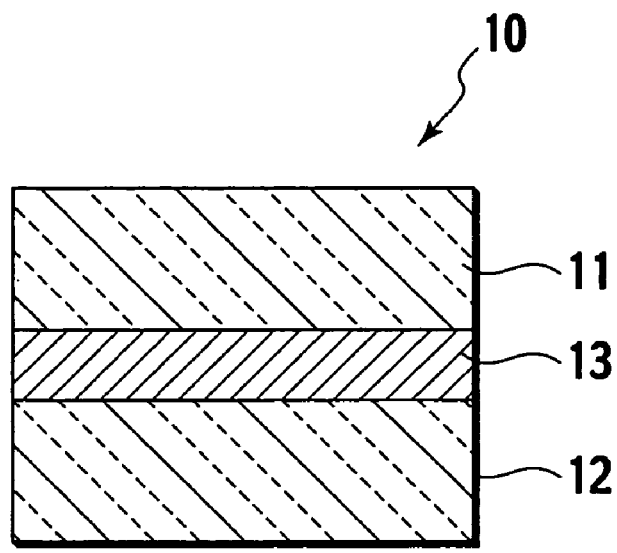
FIG. 1 is a cross-sectional view of a joined body according to an embodiment of the present invention.

As shown in FIG. 1, a joined body 10 includes a first ceramic member 11, a second ceramic member 12, and a joining layer 13, in which the joining layer 13 contains soft metal. Then, a joining material is inserted between the first ceramic member 11 and the second ceramic member 12, and the first ceramic member 11 and the second ceramic member 12 are thermally compressed at the joining temperature lower than a liquidus of the soft metal in the joining material, thereby joining the first ceramic member 11 and the second ceramic member 12 through the joining layer 13.

The first ceramic member 11 and the second ceramic member 12 may be formed of the same ceramics, or may be formed of different ceramics.

It is preferable that a difference in thermal expansion coefficient between the first ceramic member 11 and the second ceramic member 12 be 1 ppm/k or less. According to this, deformation of the first and second ceramic members 11 and 12 owing to the joining can be further suppressed.

For example, ones which contain alumina ($Al_2O_3$), aluminum nitride (AlN), silicon carbide (SiC), silicon nitride ($Si_3N_4$), sialon (SiAlON), and the like can be used as the first ceramic member 11 and the second ceramic member 12. It is preferable that the first ceramic member 11 and the second ceramic member 12 contain the alumina or the aluminum nitride.

It is preferable that the joining layer 13 contain aluminum (Al), an aluminum alloy, or the like as the soft metal. It is more preferable that the joining layer 13 contain the aluminum alloy. According to this, the joining temperature can be lowered, and the deformation and quality deterioration of the first and second ceramic members 11 and 12 owing to the joining can be further suppressed. For example, when the joining layer 13 contains the aluminum alloy, the joining temperature concerned can be set at 600° C. or lower.

It is preferable that the aluminum alloy contain 0.5 to 5 wt % magnesium (Mg). Vapor pressure of the magnesium rises at 500° C. or higher. Moreover, the magnesium has strong reduction power. Accordingly, owing to a fact that the aluminum alloy contains a predetermined amount of the magnesium, the magnesium contained in the aluminum alloy breaks an oxide film on a surface of the aluminum alloy, and thus can increase activity of the surface of the aluminum alloy. As a result, mutual adherence of the first and second ceramic members 11 and 12 can be enhanced, and a better joined state can be obtained.

Moreover, in the case of using the alumina and the aluminum nitride as the first ceramic member 11 and the second ceramic member 12, it is preferable that the joining layer 13 contain the aluminum alloy. According to this combination, affinity between the joining layer 13 and the first and second ceramic members 11 and 12 can be enhanced, and a good joined state with high adherence can be obtained.

It is preferable that thickness of the joining layer 13 be 0.05 to 0.3 mm. According to this, the deformation and quality deterioration of the first and second ceramic members 11 and 12 owing to the joining can be suppressed appropriately.

Moreover, it is preferable that the joining temperature of the first and second ceramic members 11 and 12 be set at a temperature which is lower than the liquidus of the soft metal and equal to or higher than a temperature obtained by subtracting 30° C. from a solidus of the soft metal (solidus −30° C.).

Here, when the above-described joining temperature is set at the liquidus or higher, liquid phase joining is brought, in which the soft metal is fused and joins the first and second ceramic members 11 and 12. In this liquid phase joining, the following problems are inherent. (1) Since a shrinkage cavity occurs in the case of coagulation, there is a possibility that a gap is formed in joined portions of the joining layer 13 and the first and second ceramic members 11 and 12, resulting in leakage of gas from this gap. (2) It becomes difficult to control the thickness of the joining layer 13. (3) For example, in the case of using an Al—Si—Mg alloy as the soft metal, Si among alloy components segregates after the liquid phase joining, and is selectively corroded when the Al—Si—Mg alloy is used under a halogen plasma environment, and accordingly, a life time of the joined portions is shortened.

Meanwhile, when the joining temperature is set lower than the temperature obtained by subtracting 30° C. from the solidus, the soft metal is hardened, and the joining material does not sufficiently enter into micro irregularities formed on joined surfaces of the first and second ceramic members 11 and 12. Accordingly, there is a possibility that a gap is formed in the joined portions of the joining layer 13 and the first and second ceramic members 11 and 12, resulting in the leakage of gas from this gap.

The joining temperature is set as described above, and the good joined state with the high adherence can be thus obtained while preventing the deformation and quality deterioration of the first and second ceramic members 11 and 12 owing to the joining.

Furthermore, it is preferable that pressure in the thermal compression be set at 4.9 to 19.8 MPa. Also according to this, the good joined state with the high adherence can be thus obtained while preventing the deformation and quality deterioration of the first and second ceramic members 11 and 12 owing to the joining.

Figure 2:
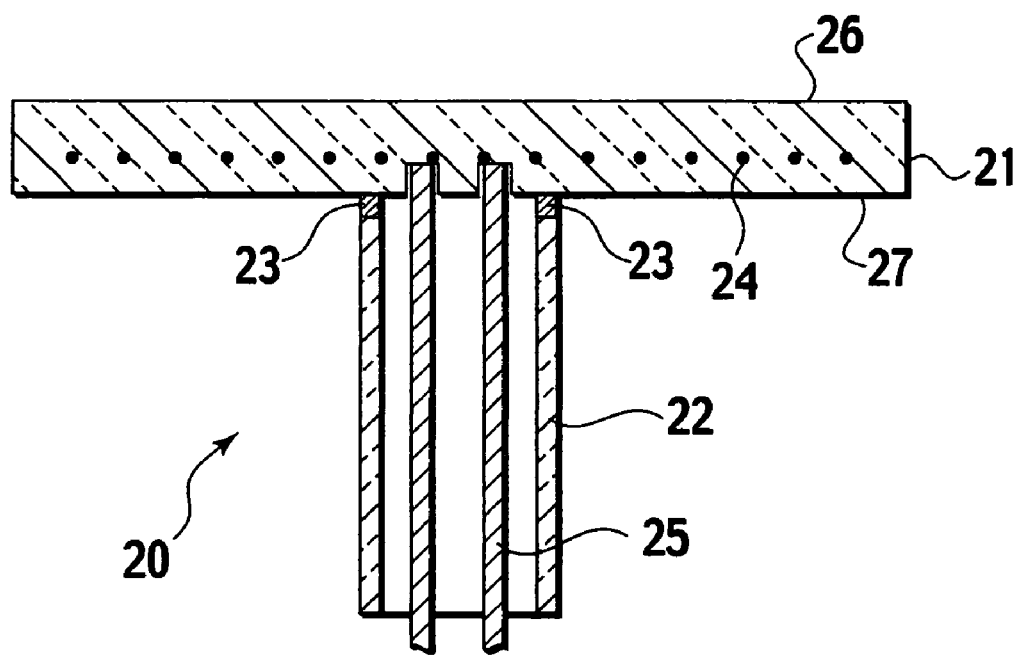
FIG. 2 is a cross-sectional view of a ceramic heater according to the embodiment of the present invention.

As a specific application example of the joined body 10 as described above, for example, a ceramic heater 20 as shown in FIG. 2 is mentioned. The ceramic heater 20 can heat a substrate such as a semiconductor substrate and a liquid crystal substrate. The ceramic heater 20 includes a base 21, a tubular member 22, a joining layer 23, and feeder members 25. In the ceramic heater 20, the base 21 in which a resistance heating element 24 is embedded is defined as the first ceramic member, and the tubular member 22 is defined as the second ceramic member.

Specifically, the tubular member 22 is joined to a back surface 27 of the base 21, which is with respect to a substrate heating surface 26, through the joining layer 23. The resistance heating element 24 is embedded in the base 21. The tubular member 22 supports the base 21 through the joining layer 23. Moreover, the feeder members 25 are disposed on an inner circumference side of the tubular member 22.

The feeder members 25 are connected to the resistance heating element 24. The resistance heating element 24 generates heat by receiving a supply of electric power, and raises temperature of the substrate heating surface 26 of the base 21. The resistance heating element 24 can be formed of a high melting point material such as tungsten (W), molybdenum (Mo), and tungsten carbide (WC).

Also in the ceramic heater 20, the base 21 and the tubular member 22 may be formed of the same ceramics, or may be formed of different ceramics. Moreover, it is preferable that a difference in thermal expansion coefficient between the base 21 and the tubular member 22 be 1 ppm/k or less. For example, the base 21 and the tubular member 22 can be formed of the alumina, the alumina nitride, the silicon carbide, the silicon nitride, the sialon, and the like. It is preferable that the base 21 and the tubular member 22 be formed of the alumina and the alumina nitride. According to this, the ceramic heater 20 excellent in corrosion resistance and heat resistance can be provided. In particular, in the case of using the aluminum nitride, uniform heating performance of the substrate heating surface 26 is also enhanced.

The aluminum, the aluminum alloy, or the like is contained as the soft metal in the joining layer 23. It is preferable that the joining layer 23 contain the aluminum alloy. It is preferable that the aluminum alloy contain 0.5 to 5 wt % magnesium (Mg). It is preferable that thickness of the joining layer 23 be 0.05 to 0.3 mm.

It is preferable that the joining temperature of the base 21 and the tubular member 22 in the ceramic heater 20 be set at the temperature which is lower than the liquidus of the soft metal and equal to or higher than the temperature obtained by subtracting 30° C. from the solidus of the soft metal (solidus −30° C.). Furthermore, it is preferable that pressure in thermal compression of the base 21 and the tubular member 22 be set at 4.9 to 19.8 MPa.

A description is made below of a manufacturing method for the joined body and the ceramic heater.

The joined body 10 shown in FIG. 1 can be manufactured in such a manner that the joining material containing the soft metal is interposed between the first ceramic member 11 and the second ceramic member 12, and that the first ceramic member 11 and the second ceramic member 12 are thermally compressed at the joining temperature lower than the liquidus of the soft metal in the joining material concerned. In the joined body 10 which has already been manufactured, the joining layer 13 containing the soft metal is formed, and the first ceramic member 11 and the second ceramic member 12 are joined to each other through the joining layer 13.

Although a shape of the joining material is not limited, for example, a soft metal plate, a soft metal sheet, and the like can be used. It is preferable that the joining temperature of the first ceramic member 11 and the second ceramic member 12 be set at the temperature which is lower than the liquidus of the soft metal and equal to or higher than the temperature obtained by subtracting 30° C. from the solidus of the soft metal, that is, the temperature equal to or higher than (solidus −30° C.). Moreover, it is preferable that the pressure in the thermal compression of the first ceramic member 11 and the second ceramic member 12 be set at 4.9 to 19.8 MPa.

The ceramic heater 20 shown in FIG. 2 can also be manufactured in such a manner that the joining material containing the soft metal is interposed between the base 21 and the tubular member 22, and that the base 21 and the tubular member 22 are thermally compressed at the joining temperature lower than the liquidus of the soft metal in the joining material concerned. For the joining material, for example, a ring-like soft metal plate and soft metal sheet, and the like can be used. Also in the ceramic heater 20 which has already been manufactured, the joining layer 23 containing the soft metal is formed, and the base 21 and the tubular member 22 are joined to each other through the joining layer 23 concerned.

The base 21 can be fabricated, for example, by firing a molded body of ceramics, in which a bulk of a coil-like or wire-like high melting point material is embedded as the resistance heating element 24. Alternatively, the base 21 can also be fabricated in such a manner that the resistance heating element 24 is formed by printing a printing paste containing the high melting point material on a ceramic sintered body by means of screen printing and the like, that the molded body of the ceramics is stacked thereon, and that the resistance heating element 24 and the molded body of the ceramics are fired integrally.

The feeder members 25 can be connected to the resistance heating element 24 after the base 21 and the tubular member 22 are joined to each other. For example, the feeder members 25 are inserted into the inner circumference side of the tubular member 22, and then the resistance heating element 24 and the feeder members 25 can be joined to each other by brazing and the like.

According to the joined body 10, the ceramic heater 20, and the manufacturing method for these in accordance with this embodiment, the joining temperature can be set at the temperature as low as less than the liquidus of the soft metal, and accordingly, the deformation and the quality deterioration can be prevented from occurring in the ceramic members owing to the joining. Hence, it is unnecessary to implement processing for correcting the deformation and the like after joining.

In particular, when the deformation and the quality deterioration occur in the ceramic heater 20 owing to the joining, there is a possibility that the uniform heating performance of the substrate heating surface 26 of the base 21 is damaged. However, according to the ceramic heater 20 in accordance with this embodiment, the deformation and the quality deterioration owing to the joining can be prevented, and accordingly, even after the base 21 and the tubular member 22 are joined to each other, the uniform heating performance of the substrate heating surface 26 can be maintained. In such a way, there is also such an advantage that it is facilitated to perform a manufacturing control of the ceramic heater 20.

As described above, since the ceramic heater 20 can maintain high uniform heating performance, the ceramic heater 20 can be utilized for manufacturing semiconductors and liquid crystal devices. For example, the ceramic heater 20 can heat substrates appropriately in a process of CVD, PVD, etching, or the like.

EXAMPLES

Next, a specific description is further made of the present invention through Example 1 and Example 2.

Example 1

In this example, the joined body 10 shown in FIG. 1 was fabricated.

First, disk shaped sintered bodies with a diameter of 40 mm and a thickness of 20 mm were prepared as the first ceramic member 11 and the second ceramic member 12. In this example, aluminum nitride, silicon carbide, alumina, or silicon nitride was used. Moreover, as the joining material for forming the joining layer 13, an aluminum alloy (JIS BA4004) with a diameter of 40 mm and a thickness of 0.1 mm was prepared.

Next, the above-described joining material was inserted between the fist ceramic member 11 and the second ceramic member 12. The thermal compression was performed for the first ceramic member 11 and the second ceramic member 12 in a state where the joining material was interposed therebetween. Specifically, by using a hot pressing apparatus, the first ceramic member 11, the second ceramic member 12, and the joining material were raised in temperature up to 550° C. which was lower than the liquidus of the aluminum alloy and equal to or higher than the temperature obtained by subtracting 30° C. from the solidus thereof (solidus −30° C.) in a vacuum with a degree of vacuum at 1 Pa, and then were maintained at 550° C. for five hours. Note that the liquidus of the aluminum alloy thus used is 591° C., and the solidus thereof is 559° C. Moreover, from the point of time when the first ceramic member 11, the second ceramic member 12, and the joining material were started to be held at 550° C., pressurization was started to be performed therefor with 9.8 MPa in one axial direction (a direction where the first ceramic member 11 and the second ceramic member 12 are pressed against each other), the pressurization was then continued until the temperature dropped to room temperature, and the joining was performed therefor. In such a way, the joining material became the joining layer 13, and the first ceramic member 11 and the second ceramic member 12 were joined to each other through the joining layer 13 concerned. By the above-described process, the joined body 10 with a diameter of 40 mm and thickness of approximately 40 mm was fabricated.

In the joined body 10, no deformation or quality deterioration was observed even by the joining. Moreover, a bending test piece with a size of 4×3×40 mm, which conformed to JIS R1601, was cut out of the joined body 10. Then, after performing a defect inspection for the test piece by means of a fluorescent flaw detection liquid, a 4-point bending test was implemented at room temperature. Ten test pieces were prepared, and an average value of 4-point bending strengths thereof was obtained in each example.

FIG. 3 shows results of the 4-point bending test. No defect was observed in the bending test pieces of Examples 1 to 4 of the present invention, a fracture position was in the inside of the base material, and solid joining was able to be implemented. Moreover, test pieces composed only of the base materials were prepared in advance, and were compared in 4-point strength with the joined bodies. In Examples 1 to 7 of the present invention, the average value of the 4-point bending strengths thereof was equivalent to that of the base material strengths of the respective ceramics thereof.

Moreover, a fracture point was an inside of either of the first ceramic member 11 or the second ceramic member 12, that is, an inside of the aluminum nitride sintered bodies. No exfoliation occurs on the joined surface of the first ceramic member 11 and the joining layer 13 or on the joined surface of the second ceramic member 12 and the joining layer 13.

Moreover, in Example 8 of the present invention, silicon carbide A,B in which carbon content was different was used. In this example 8, the thermal expansion coefficient between the first ceramic member and the second ceramic member is 4.0 ppm/k, 3.0 ppm/k respectively. Since, a difference in thermal expansion coefficient between the first ceramic member and the second ceramic member was 1.0 ppm/k, the strength of this joined body was high.

Meanwhile, in Comparative example 1, since a difference in thermal expansion coefficient between the first ceramic member and the second ceramic member was as large as 2.5 ppm/K, a crack occurred in the joined body, and the 4-point bending strength thereof was 250 MPa, which was inferior to the strengths of the respective base materials.

In Comparative example 2, since Mg content in the joined body was too little, active force on joining interface was insufficient. Therefore, the strength of this joined body was low.

In Comparative example 3, since Mg content in the joined body was too much, the thickness of oxide film in Mg was thick. Therefore, the strength of this joined body was low.

In Comparative example 4, since thickness of the joined body was too thin, a stress buffer effect was too little. Therefore, the strength of this joined body was low.

In Comparative example 5, since thickness of the joined body was too thick, difference in thermal expansion coefficient between the first ceramic member and the second ceramic member was too high. Therefore, the strength of this joined body was low.

Moreover, in Comparative examples 2 to 5, a crack did not occur in the joined body. However, gap was remained on joining interface.

Example 2

The ceramic heater 20 shown in FIG. 2 was fabricated. First, the base 21 was fabricated. 95 wt % aluminum nitride powder and 5 wt % yttria ($Y_2O_3$) powder as sintering aids were mixed together, and raw material powder was thus prepared. A plate-like molded body was fabricated by using the raw material powder. At this time, coil-like molybdenum was embedded as the resistance heating element 24 in the molded body, and an integrally molded body made of the aluminum nitride and the resistance heating element 24 was formed. The molded body was fired by a hot pressing method, and the plate-like aluminum nitride sintered body in which the resistance heating element 24 was embedded was fabricated. The aluminum nitride sintered body was subjected to contour processing, grinding processing for a joined surface thereof to the tubular member 22, drilling processing for inserting the feeder members 25, and the like, and the base 21 with a diameter of 300 mm and a thickness of 15 mm was thus fabricated. Then, as the feeder members 25, two nickel (Ni) rods with a diameter of 4 mm and a length of 300 mm were joined to the resistance heating element 24 by the brazing.

The tubular member 22 was fabricated separately from the above. A binder was mixed with raw material powder similar to that of the base 21, followed by granulation, and by using granulated powder thus obtained, a tubular molded body was fabricated by a cold isostatic pressing (CIP) method. After being subjected to degrease, the molded body was fired by an atmospheric pressure sintering method, and the tubular aluminum nitride sintered body was fabricated. The aluminum nitride sintered body was subjected to contour processing, grinding processing for a joining surface thereof to the base 21, and the like, and the tubular member 22 with an outer diameter of 75 mm, a thickness of 5 mm, and a length of 280 mm was thus fabricated.

Next, the joining material was prepared. This joining material is one obtained by performing punching processing for an Al alloy sheet (JIS BA4004) with a thickness of 0.12 mm into a shape (a ring shape) corresponding to a shape (a ring shape) of the joined portion of the base 21 and the tubular member 22.

The Al alloy sheet was inserted as the joining material between the base 21 and the tubular member 22. The thermal compression was performed for the base 21 and the tubular member 22 in a state where the joining material was inserted therebetween. Specifically, by using the hot pressing apparatus, the base 21 and the tubular member 22 were raised in temperature up to 550° C. which was lower than the liquidus of the aluminum alloy (591° C. in the present invention) and equal to or higher than the temperature obtained by subtracting 30° C. from the solidus (559° C. in the present invention) thereof (solidus −30° C.) in the vacuum with a degree of vacuum at 1 Pa, and then were maintained at 550° C. for five hours. Moreover, from a point of time when the base 21 and the tubular member 22 were started to be held at 550° C., the pressurization was started to be performed therefor with 10 MPa in one axial direction (a direction where the base 21 and the tubular member 22 are pressed against each other), the pressurization was then continued until the temperature dropped to the room temperature, and the joining was performed therefor. The obtained joined body of the base 21 and the tubular member 22 was subjected to the finishing processing, and the ceramic heater 20 was obtained. In this ceramic heater 20, the joining layer 23 was formed, and the base 21 and the tubular member 22 were joined to each other through the joining layer 23 concerned.

In the ceramic heater 20, the deformation or the quality deterioration was not observed even after the base 21 and the tubular member 22 were joined to each other. Moreover, a leak test of helium gas was performed in order to evaluate air tightness of the joined portion. Specifically, to an end of the tubular member 22 on an opposite side to the joined surface, a helium gas detector was connected through an O-ring. Since the helium gas detector has a flange portion, the flange portion was fitted to the tubular member 22 through the O-ring. Then, after the tubular member 22 was evacuated by using the helium gas detector, the helium gas was blown to the joined portion of the base 21 and the tubular member 22. Then, an amount of the helium gas which entered from the joined portion into the tubular member 22 was measured as a leak amount thereof by using the helium gas detector. The leak amount of the helium gas was less than $1 \times 10^{-8}$ Pa·m$^3$/sec, and it was able to be confirmed that there was hardly a leak from the joined portion. Hence, it was able to be confirmed that the joined state of the base 21 and the tubular member 22 was good, and that extremely high air tightness was able to be ensured.

Moreover, the uniform heating performance of the substrate heating surface 26 of the ceramic heater 20 was evaluated. An electric current was introduced into the resistance heating element 24 from the feeder members 25, and the resistance heating element 24 was thus made to generate heat. Then, the substrate heating surface 26 of the base 21 was raised in temperature, and the uniform heating performance of the substrate heating surface 26 was evaluated. It was able to be confirmed that a temperature difference on the substrate heating surface 26 was suppressed within a range of +10° C. at an average temperature of 400° C., and that high uniform heating performance was able to be maintained even after the joining.

Moreover, in Comparative example 6, a joining temperature was 595° C., which was higher than the liquidus. In Comparative example 7, a joining temperature was 524° C., which was lower than 35° C. from the solidus. The leak amount of the helium gas was more than $1 \times 10^{-6}$ Pa·m$^3$/sec, and it was not able to be used.

Note that the present invention is not limited to the above descriptions of the embodiment and the examples, and various alterations are possible.

What is claimed is:

1. A ceramic heater, comprising:
   a base ceramic member having a resistance heating element embedded therein;
   a tubular ceramic member;

a single joining layer having a thickness of 0.05 to 0.3 mm, and which joins the base ceramic member directly to the tubular ceramic member; and feeder members disposed inside said tubular ceramic member for supplying power to the resistance heating element, wherein the single joining layer comprises an aluminum alloy containing 9.0 to 10.5 wt % silicon, 1.0 to 2.0 wt % magnesium, no more than 0.8 wt % iron, no more than 0.25 wt % copper, no more than 0.10 wt % manganese, no more than 0.20 wt % Zn and no more than 0.15 wt % of any other element aside from aluminum, with the maximum amount of each such other element being no more than 0.05 wt % and with aluminum being the balance of the composition, and directly joins the base ceramic member and the tubular ceramic member to each other by being thermally compressed at a joining temperature that is equal to or higher than a temperature obtained by subtracting 30° C. from a solidus of the aluminum alloy and lower than a liquidus of the aluminum alloy.

2. The ceramic heater according to claim 1, wherein a difference in thermal expansion coefficient between the base ceramic member and the tubular ceramic member is 1 ppm/k or less.

3. The ceramic heater according to claim 1, wherein the base ceramic member and the tubular ceramic member contain at least one of alumina and aluminum nitride.

4. The ceramic heater according to claim 1, wherein pressure at the thermal compression is 4.9 to 19.8 MPa.

5. A method of manufacturing a ceramic heater, comprising:

interposing a single joining material layer having a thickness of 0.05 to 0.3 mm, and comprising an aluminum alloy containing 9.0 to 10.5 wt % silicon 1.0 to 2.0 wt % magnesium, no more than 0.8 wt % iron, no more than 0.25 wt % copper, no more than 0.10 wt % manganese, no more than 0.20 wt % Zn and no more than 0.15 wt % of any other element aside from aluminum, with the maximum amount of each such other element being no more than 0.05 wt % and with aluminum being the balance of the composition between a base ceramic member having a resistance heating element embedded therein and a tubular ceramic member; and thermally compressing the base ceramic member and the tubular ceramic member at a joining temperature that is equal to or higher than a temperature obtained by subtracting 30° C. from a solidus of the aluminum alloy and lower than a liquidus of the aluminum alloy, thereby joining the base ceramic member and the tubular ceramic member directly to each other through the single joining material layer.

6. The method of manufacturing a ceramic heater according to claim 5, wherein a difference in thermal expansion coefficient between the base ceramic member and the tubular ceramic member is 1 ppm/k or less.

7. The method of manufacturing a ceramic heater according to claim 5, wherein the base ceramic member and the tubular ceramic member contain at least one of alumina and aluminum nitride.

8. The method of manufacturing a ceramic heater according to claim 5, wherein pressure at the thermal compression is 4.9 to 19.8 MPa.

9. The ceramic heater according to claim 1, wherein the base ceramic member and the tubular ceramic member comprise AlN.

10. A ceramic heater, comprising:

a base ceramic member having a resistance heating element embedded therein;

a tubular ceramic member;

a single joining layer having a thickness of 0.05 to 0.3 mm, and which joins the base ceramic member directly to the tubular ceramic member; and feeder members disposed inside said tubular ceramic member for supplying power to the resistance heating element, wherein the single joining layer comprises an aluminum alloy containing 5 wt % magnesium, and directly joins the base ceramic member and the tubular ceramic member to each other by being thermally compressed at a joining temperature that is equal to or higher than a temperature obtained by subtracting 30° C. from a solidus of the aluminum alloy and lower than a liquidus of the aluminum alloy.

11. The ceramic heater according to claim 10, wherein the base ceramic member and the tubular ceramic member comprise AlN.

12. The ceramic heater according to claim 1, wherein the base ceramic member and the tubular ceramic member each having joining surfaces that are ceramic only, and wherein the base ceramic member and the tubular ceramic member are directly joined through said ceramic joining surfaces and the single joining layer only.

* * * * *